(12) United States Patent
Gerlach et al.

(10) Patent No.: US 6,853,756 B2
(45) Date of Patent: Feb. 8, 2005

(54) TUNABLE OPTICAL WAVEGUIDE FILTERS WITH OPTIMIZED LENGTHS AND METHOD OF DESIGNING SAME

(75) Inventors: Derek U. Gerlach, Palo Alto, CA (US); Andrea Caprara, Menlo Park, CA (US); Stephen P. Boyd, Stanford, CA (US)

(73) Assignee: Helios Photonics, Inc., Palo Alto, CA (US)

( * ) Notice: Subject to any disclaimer, the term of this patent is extended or adjusted under 35 U.S.C. 154(b) by 252 days.

(21) Appl. No.: 10/105,636

(22) Filed: Mar. 25, 2002

(65) Prior Publication Data

US 2003/0179972 A1 Sep. 25, 2003

(51) Int. Cl.[7] .............................. G02F 1/01; G02B 27/00
(52) U.S. Cl. ............................................ 385/1; 359/578
(58) Field of Search .............................. 385/24, 21, 15, 385/16, 20; 359/577, 578, 127, 128, 130

(56) References Cited

U.S. PATENT DOCUMENTS

| | | | | |
|---|---|---|---|---|
| 5,572,611 A | * | 11/1996 | Jinguji et al. ................. | 385/17 |
| 5,596,661 A | * | 1/1997 | Henry et al. ................... | 385/24 |
| 5,604,618 A | * | 2/1997 | Mori et al. .................... | 385/24 |
| 6,453,086 B1 | * | 9/2002 | Tarazona ....................... | 385/20 |
| 6,456,380 B1 | * | 9/2002 | Naganuma .................... | 356/450 |
| 6,611,371 B2 | * | 8/2003 | Wigley et al. ............. | 359/337.2 |
| 6,710,914 B2 | * | 3/2004 | Arbore et al. .............. | 359/330 |

* cited by examiner

*Primary Examiner*—Joseph Williams
*Assistant Examiner*—Peter Macchiarolo
(74) *Attorney, Agent, or Firm*—Ritter, Lang & Kaplan LLP

(57) ABSTRACT

A generalized tunable optical filter with interconnected processing devices, such as unequal arm Mach-Zehnder interferometric devices and ring resonator devices, is described. Each of the processing elements is characterized by a parametric length $\Delta l_k = n_k \Delta l_f$ where $n_k$ is an integer greater than 30 and $\Delta l_f$ is the longest length common to all of the processing elements. The optical filter is tuned by the setting of actuators in the processing elements with each setting corresponding to a predetermined filter response, such as for chromatic dispersion compensation and WDM add/drop multiplexer applications. To determine the design variables of the optical filter, such as the coupling angles $\theta$ and parametric lengths $\Delta l_k$ for the processing elements, a methodology of determining these variables from the desired application is also described.

31 Claims, 9 Drawing Sheets

A cascade of partially tunable Mach-Zehnder units.

$\Delta L_{mz} = L_b - L_a$

A Mach-Zehnder interferometer

A ring resonator.

A tunable Mach-Zehnder

A partially tunable Mach-Zehnder

A tunable ring resonator.

A partially tunable ring resonator.

Variable coupler constructed from two directional couplers.

Magnitude Gain = $M(f, \underline{a}_i, \underline{\ell}) = \frac{y_0}{x_0}$

Group Delay = $GD(f, \underline{a}_i, \underline{\ell}) = \tau$

Definitions of magnitude and group delay

A cascade of partially tunable Mach-Zehnder units.

Dispersion compensation of optical fiber

The group delay vs. frequency,
with upper and lower bounds.

The magnitude gain vs.
frequency, with upper and lower bounds.

Group delay response of filter #1.

Group delay response of filter #2.

Group delay response of filter #3.

An add/drop multiplexer

TUNABLE OPTICAL WAVEGUIDE FILTERS WITH OPTIMIZED LENGTHS AND METHOD OF DESIGNING SAME

BACKGROUND OF THE INVENTION

The present invention relates to optical waveguide filters for performing arbitrary filtering operations useful in optical communication, optical exchange, or other optical signal processing applications. Specifically, this invention relates to tunable filters by which the filtering operation can be modified to accommodate different filtering response functions, all using the same physical device. By optimizing the lengths of waveguides in the filter, unprecedented filtering performance may be achieved.

Optical waveguide filters are important devices in optical communication and optical signal processing and can perform many useful functions of optical filtering. For example, in optical fiber communication, signals experience chromatic dispersion, which spreads each optical pulse among neighboring pulses. This spreading renders the signal unintelligible to the receiver. However, an optical filter, whose response inverts the chromatic dispersion, can recompress the pulses and restore the signal fidelity. Such a filter is called a chromatic dispersion compensator (CDC).

For CDC applications, several different filtering response functions may be required of the same device. The amount of chromatic dispersion experienced by a signal depends on the length and type of fiber through which the signal propagates. If the routing of a signal should change, the length/type of fiber through which the signal propagates will change. This causes the chromatic dispersion to change. Hence, it is advantageous for a CDC device to be tunable so that several different lengths of fiber can be compensated using the same device. If the CDC device is not tunable, it must be replaced whenever the signal routing (and therefore dispersion) changes, which is costly and cumbersome. Tunable optical filters can therefore have a real advantage over nontunable filters.

Optical waveguide filters are particularly suitable for practical applications because they may be implemented monolithically on substrates, such as silica-on-silicon and polymer-based monolithic waveguide technology. This facilitates manufacturability and long term stability.

There are two typical waveguide processing elements which may be used as building blocks to form optical filters. The first, shown in FIG. 1A, is the unequal arm Mach-Zehnder interferometer, and the second, shown in FIG. 1B, is the ring resonator. Such processing elements may be interconnected and/or combined in various ways to form more complex filters to achieve desired filtering functions. The Mach-Zehnder interferometer has a pair of waveguides, a first coupler between the two waveguides, a second coupler between the two waveguides, and a differential length, denoted $\Delta l_{mz}$, of the waveguides between the two couplers. The ring resonator has a ring waveguide, a feeder waveguide, and a coupler providing coupling between the ring and feeder waveguides. The circumference of the ring is denoted $\Delta l_r$.

To provide tunability of the Mach-Zehnder interferometer, a phase shifter may be used in one of the arms. To provide additional tunability, a variable, instead of fixed, coupler may be employed. (The behavior of fixed and tunable couplers is described below). A fully tunable Mach-Zehnder interferometer is illustrated in FIG. 2A. A partially tunable Mach-Zehnder, using a phase shifter and a fixed coupler, is shown in FIG. 2B. To provide tunability of the ring resonator, a phase shifter is used within the ring. The feeder wave guide is coupled with a tunable or fixed coupler to the ring waveguide, as shown in FIG. 2C and FIG. 2D.

A fixed coupler has a transfer matrix between its two input and two output waveguides given by:

$$H(\theta) = \begin{pmatrix} \cos\theta & j\sin\theta \\ j\sin\theta & \cos\theta \end{pmatrix}$$

where the coupling angle $\theta$ is given by $\theta=2\pi\Delta n_{eff}l_c/\lambda$. The quantity $\Delta n_{eff}$ is the effective index difference between the odd and even modes, $l_c$ is the coupling length, and $\lambda$ is the light wavelength.

A variable coupler may be made from two fixed 90° couplers and a phase shifter, as represented in FIG. 3. Tuning of the couplers and phase shifter is accomplished with different methods. One method is to heat the waveguide, another is to induce stress into the waveguide with piezoelectric actuators, and still another is to place the waveguide under the influence of electrical fields.

Many different types of filter structures may be constructed from various combinations of the Mach-Zehnder interferometer and the ring resonator. For example, lattice optical filters comprised of a serial cascade of Mach-Zehnder elements (the same arrangement as illustrated in FIG. 4) have been described in U.S. Pat. No. 5,572,611; a paper by K. Jinguji and M. Kawachi, "Synthesis of Coherent Two-Port Lattice-Form Optical Delay-Line Circuit," *Journal of Lightwave Technology*, Vol 13, No 1, January 1995, pp.73–81; and a text, *Optical Filter Design and Analysis* by Christi Madsen and Jian Zhao, John Wiley and Sons, 1999. Each element has the same differential delay. In these references, it is shown that the lattice structure is mathematically equivalent to a finite impulse response (FIR) filter. By employing the fully tunable Mach-Zehnder element in FIG. 2A, a single device may be tuned to achieve an arbitrary FIR filter response. Many other structures are possible, such as the all pass filter structure, made of a serial or parallel cascade of ring resonators. The Madsen and Zhao text provides a good overview of the different types of structures possible.

The performance and behavior of an optical waveguide filter are greatly affected by the choice of the lengths, $\Delta l_{mz}$ and/or $\Delta l_r$ (for filters using Mach-Zehnder and/or ring resonator processing elements in various combinations). An early example described in the Jinguji and Kawachi paper cited above, has a serial cascade of Mach-Zehnder stages, each with the same differential length. The frequency response of this filter is periodic, with free spectral range given by $c/(\Delta l_{mz}n_{eff})$, where c is the speed of light, and $n_{eff}$ is the effective index of the waveguide. As mentioned before, this filter is equivalent to a discrete-time FIR filter. U.S. Pat. No. 5,596,661 describes another serial cascade of Mach-Zehnder stages in which the differential lengths $\Delta l_{mz}$ in the stages are optimized for separating 1.3 and 1.55 µm telecommunications channels, and for flattening the gain of EDFAs (Erbium-Doped Fiber Amplifiers). The length optimization accounts for the nonideal behavior of couplers and waveguides. Additionally, fewer stages are needed to achieve the desired filtering than compared to lattice Mach-Zehnder filters with $\Delta l_{mz}$ equal in each stage. Tunability was not provided in this design.

For tunable filters, a paper by C. Madsen, G. Lenz, A. J. Bruce, M. A. Cappuzzo, L. T. Gomez, and R. E. Scotti, "Integrated All-Pass Filters for Tunable Dispersion and Dispersion Slope Compensation," *IEEE Photonics Letters*, December 1999, pp. 1623–1625, describes the achievement of tunable dispersion compensation using cascaded ring resonator structures with actuators to tune the coupling from the feeder waveguide to the ring resonator. The amount of chromatic dispersion compensation may be tuned. The ring circumferences $\Delta l_r$ of the rings are selected according to a 'Vernier' design, in which the circumferences are all small multiples of a fundamental length, by which the free spectral range of the filter device is increased to the reciprocal of the fundamental length, rather than just the reciprocal of the circumference of one of the rings. U.S. Pat. No. 6,285,810 describes another optical filter in the form of a tunable add/drop multiplexer (ADM) useful in dense wavelength division multiplexing (DWDM) systems for injecting or extracting optical carriers of selected wavelengths, from a plurality of optical carriers of distinct wavelengths. In this optical filter, one or two of the waveguide lengths are optimized in a lattice filter similar to that of FIG. 4. All the other remaining waveguide lengths are equal, except these two, by which some improvement in performance is achieved.

The present invention recognizes that advancement can proceed even further. The filter described by K. Jinguji and M. Kawachi requires more stages in comparison to filters with better choices of lengths $\Delta l_{mz}$ and/or $\Delta l_r$ for better performance. Similarly, the nontunable filter of U.S. Pat. No. 5,596,661 is limited; only one filtering operation may be implemented. Even the described tunable filter devices have shortcomings. By constraining the circumferences ring resonators to be small multiples of a fundamental length, the filter of the Madsen et al. paper foregoes many useful capabilities. These capabilities include the simultaneous tunability of the dispersion slope, tunability of higher order dispersion, or tunability of the gain vs. frequency response. Similarly, the filter described in U.S. Pat. No. 6,285,810 requires more stages than necessary to achieve desired performance. Savings in the number of stages of 20–30% can be realized.

In accordance with the present invention, a fully tunable optical filter is provided which addresses the requirements of performance and flexibility.

SUMMARY OF THE INVENTION

This invention provides for a generalized tunable optical filter having at least one input waveguide, at least one output waveguide, at least three processing elements interconnected between the input waveguide and the output waveguide; and a plurality of actuators tuning phases of light signals passing through the processing elements. Each of the processing elements, such as unequal arm Mach-Zehnder interferometer devices or a ring resonator devices, is characterized by a parametric length $\Delta l_k = n_k \Delta l_f$ where $n_k$ is an integer greater than 30 and $\Delta l_f$ is the longest length common to all of said processing elements. A length $\Delta l_1$ is common to lengths $\Delta l_2$ and $\Delta l_3$ if and only if $\Delta l_2/\Delta l_1$ and $\Delta l_3/\Delta l_1$ are both integers. The optical filter is tuned by the setting of the actuators with each setting corresponding to a predetermined filter response, such as for chromatic dispersion compensation and WDM add/drop multiplexer applications.

The present invention also provides for a generalized tunable optical filter having at least one input waveguide, at least one output waveguide, at least three unequal arm Mach-Zehnder interferometer devices in a cascaded serial connection between the input waveguide and the output waveguide. Each of the three unequal arm Mach-Zehnder interferometer devices is characterized by a parametric length $\Delta l_k = n_k \Delta l_f$ where $n_k$ is an integer greater than 30 and $\Delta l_f$ is the longest length common to all of the unequal arm Mach-Zehnder interferometer devices. A plurality of actuators responsively tune phases of light signals passing through the unequal arm Mach-Zehnder interferometer devices so that a selected setting of the actuators corresponds to a selected filter response.

The present invention provides for a method of designing a generalized tunable optical filter which has at least one input waveguide, at least one output waveguide, at least three processing elements interconnected between the input waveguide and the output waveguide by a plurality of fixed couplers, and an plurality of actuators tuning phase variables φ for light signals at frequency f passing through the processing elements. Each coupler has a phase variable θ, and each of the processing elements is characterized by a parametric length variable $\Delta l_k$. The phase variables e, parametric lengths variables AIkS, actuator phase variables φ's define a filter response for light signals at frequency f. The method comprises selecting starting values for the variables; determining an optimized objective predetermined property, such as a maximum group delay ripple, of a desired filter response corresponding to the variables; and computationally varying the variables from the starting values to find values of the variables corresponding to the desired filter response. The method can also include the step of defining constraints on at least one property, such as bounds on the group delay and gain, of the filter response.

DESCRIPTION OF THE SPECIFIC EMBODIMENTS

The present invention provides for a generalized tunable filter in which the waveguide lengths of the filter's processing elements are optimized so that optimum filter performance results when the filter is tuned to any member of a family of different filter response functions. New functionalities can be incorporated into tunable filters and old functionalities may be realized with a fewer number of stages than with previous filters.

Another aspect of this invention provides for fixed couplers with predetermined coupling lengths. Compared to tunable couplers, fixed couplers are more compact and therefore require less real-estate in a planar waveguide implementation. In addition, fixed coupler designs require less power than thermooptically actuated tunable coupler designs. By using fixed couplers, approximately half the thermooptic actuation power is needed. Until now, no method of designing a tunable filter using arbitrary fixed couplers has been provided.

For example, in accordance with the present invention, an effective chromatic dispersion compensator can be provided for a dense wavelength division multiplexing (DWDM) system. Practically any type of response which varies smoothly from wavelength to wavelength can be generated. This enables dispersion compensation, dispersion slope compensation, and $2^{nd}$, and even higher, order dispersions as well. It also enables gain compensation to be performed simultaneously. Undesirable gain variation across the wavelengths may occur due to the nonflatness of the amplification of EDFAs (Erbium-Doped Fiber Amplifiers), which are commonly used in optical networks. These gain variations can change slowly with time. The present invention provides a tunable device that can accommodate these various gain responses, and dispersions, dispersion slopes, and even higher order dispersions.

Figure 4:
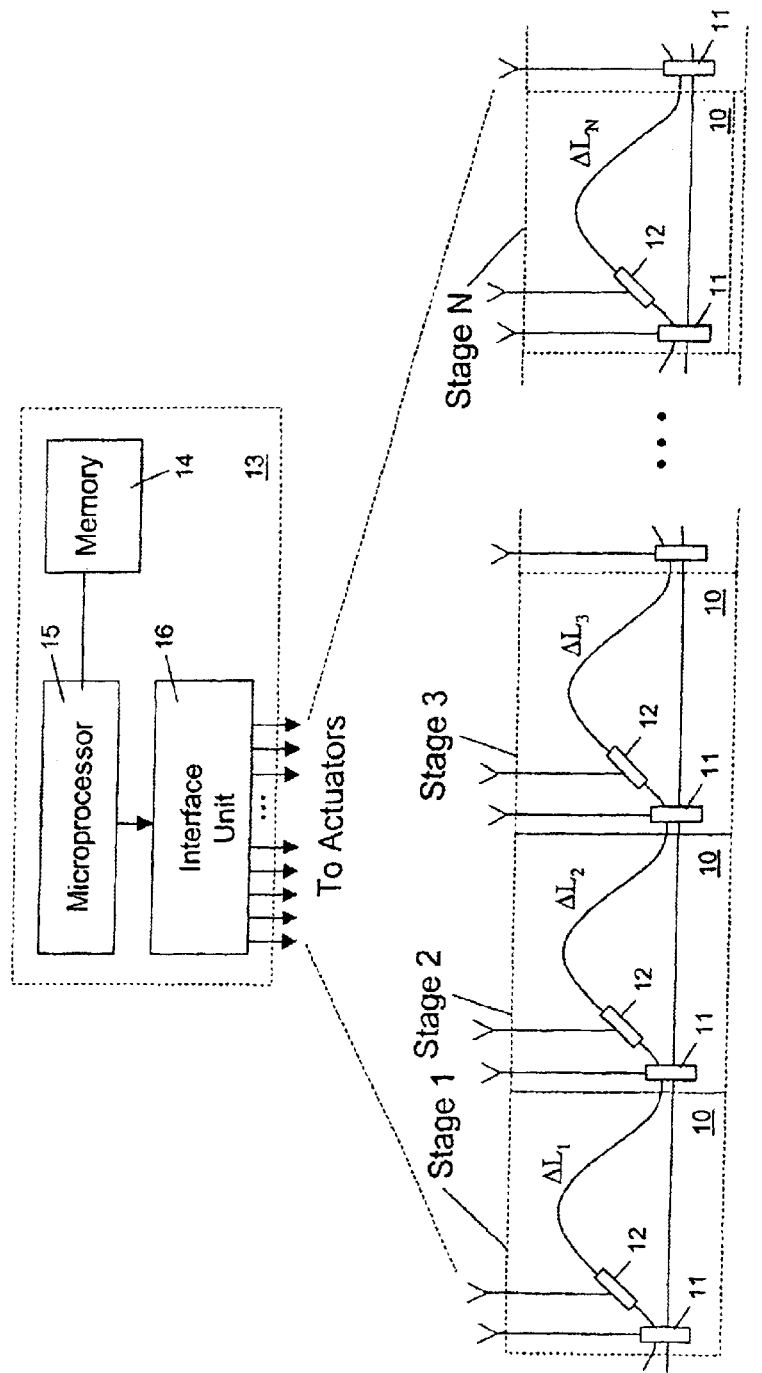
FIG. 4 illustrates the arrangement of cascade-connected Mach-Zehnder processing elements, according to one embodiment of the present invention.

An embodiment of the present invention is illustrated in FIG. 4 in which N processing elements, in this example, N unequal arm Mach-Zehnder interferometric devices 10, are connected in a cascaded serial connection. This arrangement is similar to the filter described in the Jinguji and Kawachi paper cited earlier. However, the FIG. 4 filter is tunable and has selected waveguide lengths $\Delta l_{mz}$ which are described in detail below. Another distinction is that the couplers are fixed, rather than tunable, so that each coupler has a selected coupling angle θ. Each of the devices 10 has fixed couplers 11 and tunable phase shifters 12, which are connected to a control unit 13. Each of the fixed couplers 11 and phase shifters 12 form $N_a$ actuators, which can affect the phase and coupling of the processing elements 10. Responsive to control signals from a control unit 13, the generalized tunable filter, through its $N_a$ actuators, achieves a set of $N_r$ predefined filter responses. A memory 14 in the control unit 13 stores the actuation values for each of the $N_r$ predefined filter responses. As described below, these actuation values are components of a variable actuation vector a. A microprocessor (or microcontroller) 15 in the control unit 13 handles operations with the memory 14 through an interface unit 16 connected to the actuators 11 and 12. Hence the described filter can be adapted to changing requirements so that the filter has $N_r$ predefined responses to which the filter can be tuned.

The coupling angles θ and differential lengths $\Delta l_{mz}$ of the unequal arm Mach-Zehnder elements 10 are selected as described below. It should be noted that if resonator ring processing elements are used in place of, or in combination with, Mach-Zehnder processing elements, then the ring circumference lengths $\Delta l_r$ are also selected in the same manner. Returning to the FIG. 4 generalized tunable filter, the differential arm length of the $k^{th}$ element is $\Delta l_k$, where length is understood to be the differential length in the case of a Mach-Zehnder interferometer. Note that for Mach-Zehnders, $\Delta l_k$ may be negative, which indicates the relative size of the Mach-Zehnder arms is opposite the usual sense. An N×1 vector l formed by the N $\Delta l_k$'s represents the waveguide lengths of the generalized tunable filter of FIG. 4. Another (N+1)×1 vector c formed by the N+1 $\theta_k$'s represents the coupling angles of the generalized tunable filter of FIG. 4.

Theoretically, the waveguide lengths are arbitrary, but practically, the finite resolution of any design process, as well as manufacturing tolerances, impose a lower limit $\Delta l_{acc}$ on the accuracy of the waveguide lengths. Without loss of generality, any element of may be expressed as a multiple of $\Delta l_{acc}$:

$$\Delta l_k = m_k \Delta l_{acc},$$

where $m_k$ is a positive integer. It is possible to remove all common factors of $m_1 \ldots m_N$ greater than one by rewriting $\Delta l_k$ as $$\Delta l_k = n_k \Delta l_f, \qquad \text{Eq. (1)}$$

where $n_k = m_k/F$, where F is the product of the common factors of $m_1 \ldots m_N$ greater than one, and $$\Delta l_f = \Delta l_{acc} F.$$

Of course, the waveguide lengths, differential or otherwise, of any tunable filters can also be represented by a vector l, whose elements may also be expressed in the form of Eq. (1). However, the generalized tunable filter of the present invention has its multiples $n_k$ selected to be much larger than those of the prior art. For example, the largest $n_k$ considered in prior art is believed to be approximately 12–15 for tunable dispersion compensation applications, the 'Vernier' type ring resonator filters discussed in the Madsen and Zhao text, cited above. In contrast, the present invention selects waveguide lengths to be at least $n_k > 30$ for at least three values of k. For example, $n_k$'s of 100 or more are considered in accordance with the present invention.

Another distinction of the present invention is that the coupling angles defined by the vector c are optimized to predetermined values. By contrast, the tunable filters of Jinguji and Kawachi consider fully tunable couplers.

Besides the waveguide lengths, characterized by the N×1 vector l, the generalized tunable filter has $N_r$ predefined filter responses. For each setting of the actuators there is one of the $N_r$ filter responses. Each setting of the actuators can be represented by an $N_a \times 1$ actuation vector a; and for the $N_r$ filter responses, there corresponds $N_r$ actuation vectors, denoted $a_1 \ldots a_{Nr}$. The generalized tunable filter variables are therefore $\{a_1 \ldots a_{Nr}, l, c\}$. The vectors c and l are chosen once, and are unchangeable once the device is manufactured, while the vector a remains tunable over $N_r$ values after manufacturing.

Figure 1A:
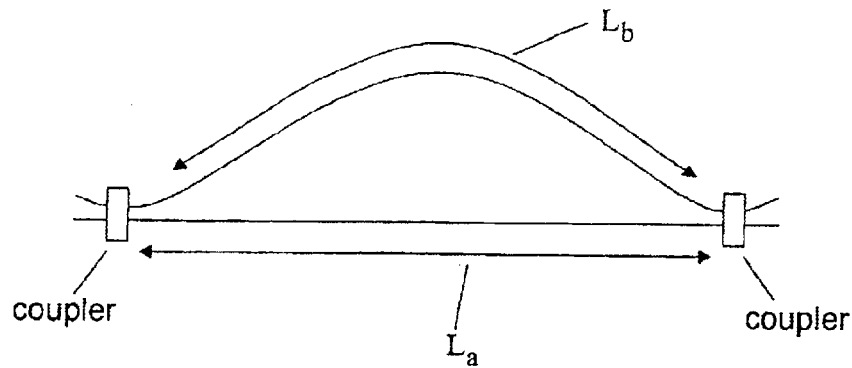
FIG. 1A is a diagram of an unequal arm Mach-Zehnder interferometer.
Figure 1B:
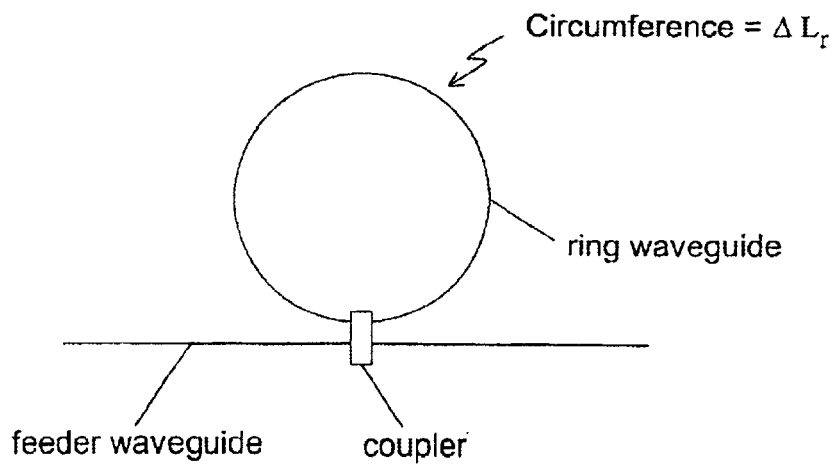
FIG. 1B is a representational diagram of a ring resonator.
Figure 2A:
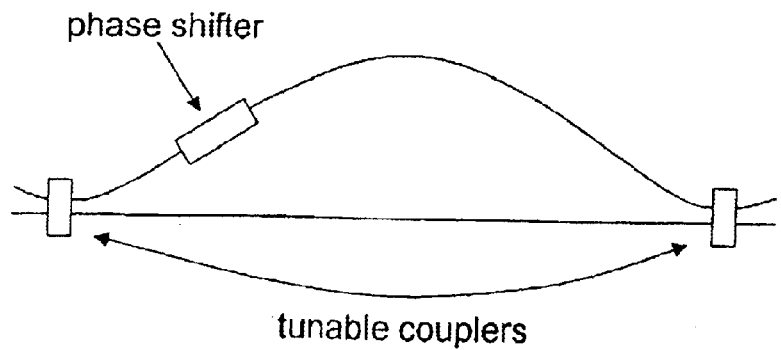
FIG. 2A is a diagram of a fully tunable Mach-Zehnder interferometer.
Figure 2B:
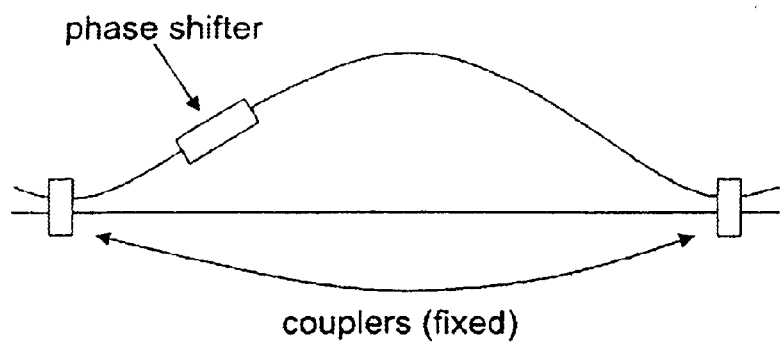
FIG. 2B is a diagram of a partially tunable Mach-Zehnder interferometer.
Figure 2C:
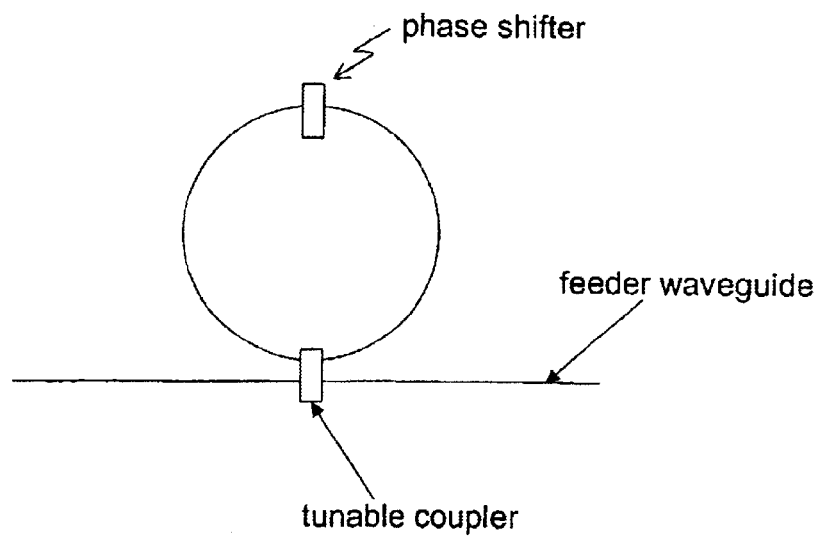
FIG. 2C is a representational diagram of a fully tunable ring resonator.
Figure 2D:
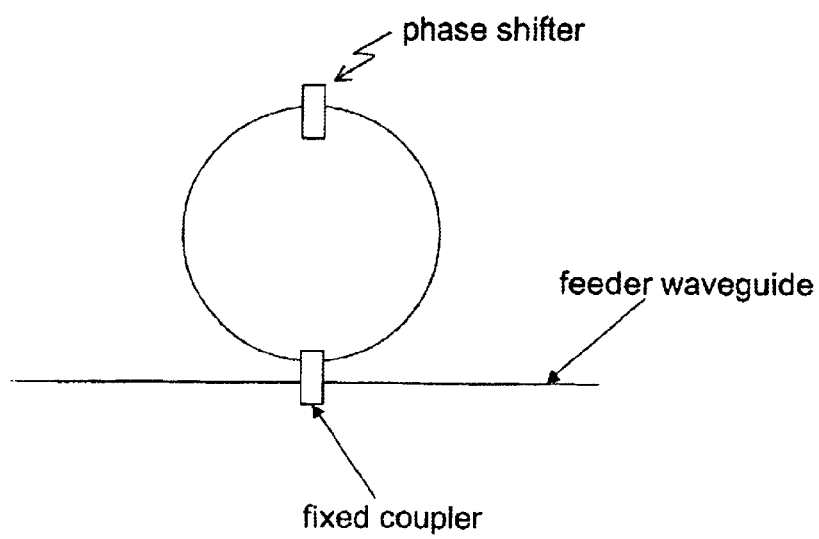
FIG. 2D is a diagram of a partially tunable ring resonator.
Figure 3:
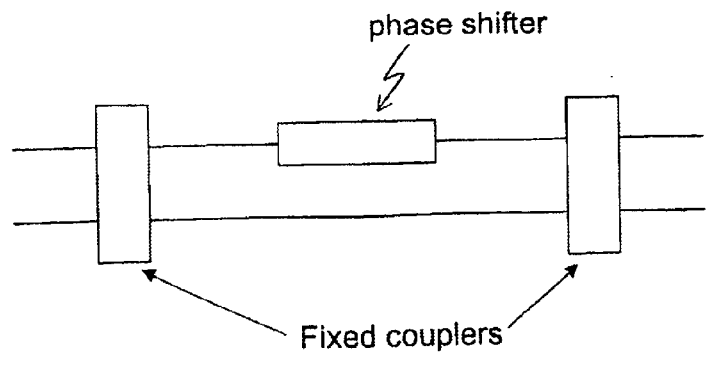
FIG. 3 is a diagram of a variable coupler.
Figure 5:
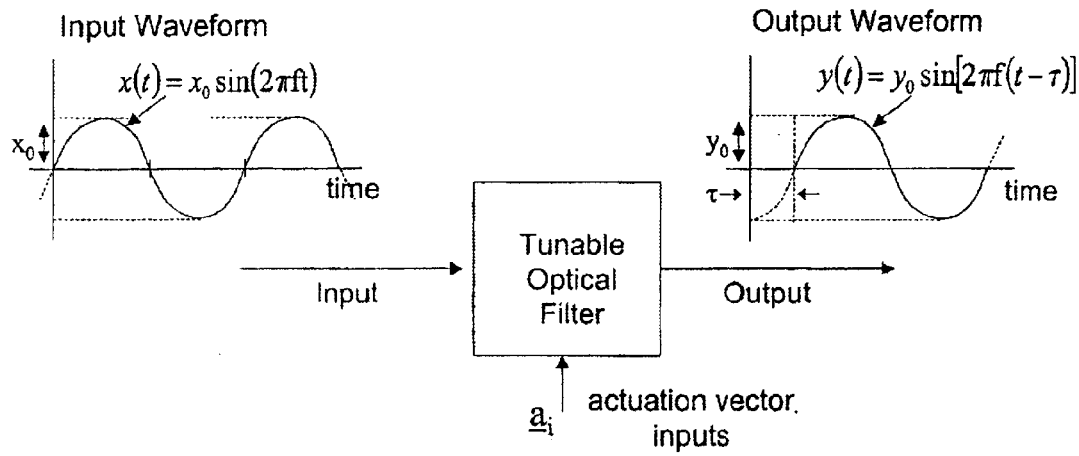
FIG. 5 is a representation of a tunable optical filter with some of its properties.

The filter responses are characterized by a particular magnitude gain, group delay, group delay slope, or other properties for the generalized tunable filter. If, for example, $M(f, a_i, l, c)$ and $GD(f, a_i, l, c)$ denote the actual magnitude gain and group delay respectively of the $i^{th}$ actuator setting, or vector $a_i$, at frequency f As illustrated by FIG. 5, $M(f, a_i, l, c)$ is the output-to-input amplitude ratio when the input is excited with a sinusoid of frequency f and the group delay $GD(f,a_i,l,c)$ is the delay $\tau$ experienced by the sinusoid of frequency f.

The functional dependence of M and GD on the values of the actuation vector a and the length vector l is known, based on simple parametric models of the waveguide frequency response. For example, the cascade of Mach-Zehnder elements shown in FIG. 4 has a two input/two output transfer function. In the absence of higher order effects, such as frequency dependence of coupling, or similarly frequency dependence of the actuator phase shifts, this 2×2 transfer matrix is given by:

$$H(f,a,l,c) = R(\theta_1)*D(\Delta l_1, \phi_1)*R(\theta_2)*D(\Delta l_2, \phi_2) \ldots R(\theta_N)*D(\Delta l_N, \phi_N)*R(\theta_{N+1}) \quad \text{Eq. (2)}$$

where $$R(\theta) = \begin{pmatrix} \cos\theta & j\sin\theta \\ j\sin\theta & \cos\theta \end{pmatrix}, \text{ and}$$

$$D(\Delta l, \phi) = \begin{pmatrix} e^{-j\beta\Delta l/2 + j\phi} & 0 \\ 0 & 1 \end{pmatrix},$$

where $j=\sqrt{-1}$ and $\beta$ is the effective waveguide propagation constant. In this case, the actuation vector $a=[\phi_1 \ldots, \phi_N]$. The quantities M and GD are then be given by:

$$M = |H_{11}| \quad \text{Eq. (3)}$$

$$GD = \frac{d(\arg(H_{11}))}{d(2\pi f)}$$

where $|.|$ denotes absolute value, and $\arg(.)$ denotes the angle. With a means of evaluating the quantities involved in the performance specification, such as an explicit analytical formula, a generalized tunable filter according to the present invention can readily be designed to meet the requirements of the particular application.

Figure 6:
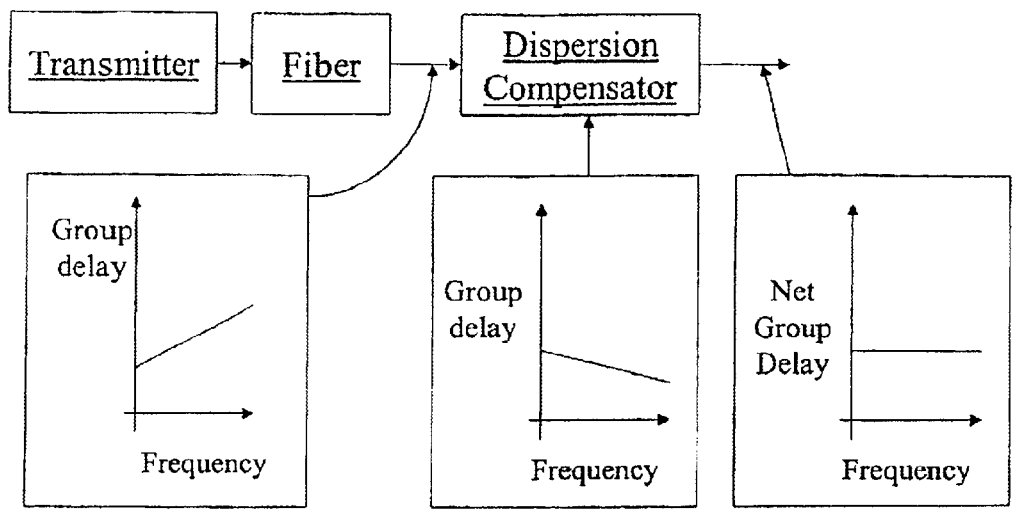
FIG. 6 is a representation of the operation of a dispersion compensator for an optical fiber.

Thus a chromatic dispersion compensation (CDC) filter can be provided according to the present invention. When a light pulse travels through an optical fiber, the pulse experiences a group delay that varies linearly vs. frequency. This is chromatic dispersion. A CDC filter with a group delay slope which is the negative to that of the fiber, can therefore compensate for this dispersion. FIG. 6 illustrates this relationship.

An exemplary chromatic dispersion compensation (CDC) filter arranged as an N=12 stage lattice filter as shown in FIG. 4 is provided in accordance with the present invention. For the (differential) length vector l, there are twelve values of $\Delta l$. For the coupler angle vector c, there are thirteen values of phase shifts $\theta$; and for the actuation vector a, there are twelve values of phase shifts $\phi$. The criteria of the CDC for the desired chromatic dispersion compensation is as follows. First, an upper and lower bound for the group delay vs. frequency are defined.

$$GD_i^{lo}(f) < GD(f,a_i,l,c) < GD_i^{up}(f), \text{ for } i=1 \ldots N_r \text{ and } f=f_1, \ldots f_{Nf} \quad \text{Eq. (4)}$$

where $GD_i^{lo}(f)$, and $GD_i^{up}(f)$, are lower and upper bounds of the group delay, respectively. These bounds vary linearly with frequency, with the slope of the group delay fixed at a desired value:

$$GD_i^{lo}(f_c+f) = t_{lo,i} + \alpha_i f \quad \text{Eq. (5)}$$

$$GD_i^{up}(f_c+f) = t_{up,i} + \alpha_i f$$

The quantity $\alpha_i$ is known as the dispersion, and it supplies the proportionality constant between frequency and group delay. The quantity $\alpha_i$ has the units of time squared, i.e., $t^2$, and determines the amount of dispersion the filter can compensate.

Modern WDM systems are designed to accommodate multiple wavelengths, each wavelength defining a communication channel for a parallel data stream, typically 10 Gigabits/sec in data rate. Each wavelength is located on a specific frequency set by the ITU (International Telecommunications Union) grid. For example, the wavelength channel number 40 is centered on 194 THz. The performance specifications of Eqs. (4) and (5) are given at a set of discrete optical frequencies, denoted $f_1 \ldots f_{Nf}$. These frequencies are sampled in the neighborhood of the ITU grid center frequency. To accommodate a 10 GHz signal on wavelength channel number 40, for example, the frequencies are sampled around 194 THz:

$$f_1 \ldots f_{Nf} = \{-8.5 \text{ GHz}, -7.5 \text{ GHz}, \ldots, +7.5 \text{ GHz}, +8.5 \text{ GHz}\}.$$

The total bandwidth 15 GHz=+8.5 to (−8.5) GHz about the center frequency is wider than the 10 GHz data rate to allow for bandwidth expansion due to pulse shaping, and to frequency drift of the laser sources. Additional wavelength channels are simultaneously specified for the same filter. A new subscript $k=1, \ldots N_c$ provides an index for the wavelength channel and now the group delay constraints are $$GD_i^{lo}(f_{c,k}+f) = t_{lo,ik} + \alpha_{ik} f \quad \text{Eq. (6)}$$

$$GD_i^{up}(f_{c,k}+f) = t_{up,ik} + \alpha_{ik} f$$

where $f_{c,k}$ is the $k^{th}$ channel center frequency (194 THz for channel number 40). In Eq. (6), $\alpha_{ik}$ is both i and k dependent, which allows each filter and each channel to have a different dispersion. In addition, $t_{lo,ik}$ and $t_{up,ik}$ are both i and k dependent, which allows each filter and each channel to have a different overall group delay. The actual values of $t_{lo,ik}$ and $t_{up,ik}$ are of little importance, but, their difference, $t_{up,ik}-t_{lo,ik}$, is the group delay ripple which determines how well the filter approximates a linear group delay.

The optimization problem may now be stated as follows. Each channel and each filter response has a group delay ripple defined by:

$$\Delta t_{ik} = t_{up,ik} - t_{lo,ik}.$$

The largest ripple subject to the inequality constraints of Eqs. (4) and (5) should be minimized. This is expressed mathematically as:

$$\min_{\{a_1 \ldots a_{Nr}, l, c, t_{lo,11}, t_{lo,12}, \ldots, t_{lo,Nf,Nc}, t_{up,11}, t_{up,12}, \ldots, t_{up,Nr,Nc}\}} \left( \max_{ik} [\Delta t_{ik}] \right), \quad \text{Eq. (7)}$$

such that $$GD_i^{lo}(f) < GD(f,a_i,l,c) < GD_i^{up}(f), \quad \text{Eq. (8)}$$

where $$\Delta t_{ik} = t_{up,ik} - t_{lo,ik}.$$

$$GD_i^{lo}(f_{c,k}+f) = t_{lo,ik} + \alpha_{ik} f$$

$$GD_i^{up}(f_{c,k}+f) = t_{up,i} + \alpha_{ik} f \text{ for } i=1, \ldots N_r \text{ and } k=1, \ldots N_c$$

Figure 7:
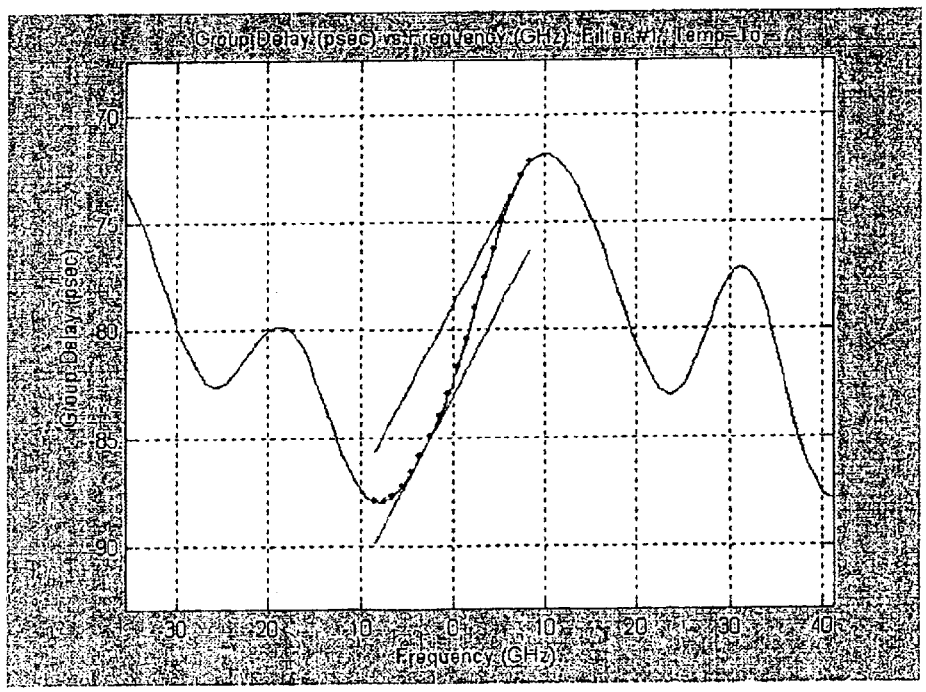
FIG. 7 is a plot of group delay versus frequency at one WDM channel for one filter response of a generalized tunable filter according to the present invention.

An example of this process is illustrated in FIG. 7. In FIG. 7, the group delay vs. frequency for one filter and one channel is plotted, with zero frequency corresponding to channel center. The lines above and below the solid line are $GD_i^{lo}(f)$ and $GD_i^{up}(f)$. The solid line is GD(f). The dots mark the frequencies $f_1 \ldots f_{Nf}$. A value of $N_f$=16 is selected.

It should be noted that in addition to the variables $\{a_1 \ldots a_{Nr}, l, c\}$, additional free variables $t_{lo,ik}$ and $t_{up,ik}$ have been introduced. The actual values of these additional free design variables have no impact on the design of the generalized tunable filter; only their difference is important in that the optimization of the filter attempts to minimize the largest group delay ripple.

Eqs. (7) and (8) determine a filter with the desired group delay properties. However, it is also necessary to add additional constraints on the magnitude gain, to insure that the desired frequency band has a sufficiently flat and low-loss response. Hence a lower limit is imposed on the magnitude gain:

$$M_{ik}^{lo} < M(f_{c,k}+f, a_i, l, c)$$

Figure 8:
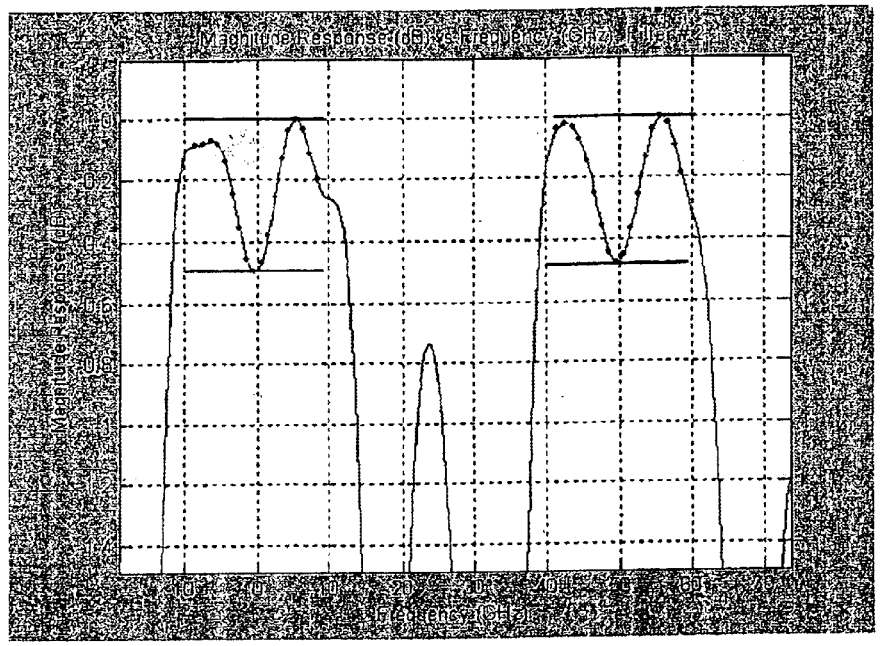
FIG. 8 is a plot of magnitude response versus frequency for two neighboring WDM channels for a filter response of the FIG. 7 generalized tunable filter according to the present invention.

This lower bound $M_{ik}^{lo}$ is frequency independent. Because the generalized tunable filter is passive, the upper limit of the magnitude gain is one, and is automatically satisfied. By making the lower limit as close to one as possible, both the ripple and insertion loss are also minimized. This is done by defining $\Delta M_{ik} = 1 - M_{ik}^{lo}$. This is the magnitude ripple of the $i^{th}$ filter and $k^{th}$ channel. FIG. 8 shows the magnitude response and the upper and lower bounds for several channels. The magnitude and group delay ripple may be simultaneously minimized by defining a relative weighting w for the two. Then the optimization problem is recast so that both the magnitude and group delay ripple are simultaneously minimized:

$$\min_{\{a_1 \ldots a_{Nr}, 1, c, t_{lo,11}, t_{lo,12}, \ldots, t_{lo,Nf,Nc}, t_{up,11}, t_{up,12}, \ldots, t_{up,Nr,Nc}, M_{11}^{lo}, \ldots, M_{Nr,Nc}^{lo}\}} \quad \text{Eq. (7)}$$

$$\left( \max_{ik} [\max(w \Delta M_{ik}, \Delta t_{ik})] \right)$$

such that $$M_{ik}^{lo} < M(f_{c,k}+f, a_i, l, c)$$

$$GD_i^{lo}(f) < GD(f, a_i, l, c) < GD_i^{up}(f), \quad \text{Eq. (8)}$$

where w is the relative weighting of the magnitude and group delay ripple, and where $$\Delta t_{ik} = t_{up,ik} - t_{lo,ik}$$

$$\Delta M_{ik} = 1 - M_{ik}^{lo}$$

$$GD_i^{lo}(f_{c,k}+f) = t_{lo,ik} + \alpha_{ik} f$$

$$GD_i^{up}(f_{c,k}+f) = t_{up,ik} + \alpha_{ik} f \text{ for } i=1, \ldots N_r \text{ and } k=1, \ldots N_c$$

The units of $\Delta t_{ik}$ are picoseconds, and the units of $\Delta M_{ik}^{lo}$ are Volts, so that the units of w are picoseconds per volt. With a w of 25 picoseconds/volt, a group delay ripple of 5 picoseconds corresponds to a 25 Volt magnitude ripple (approximately 0.44 dB ripple).

Solving Eq.(7–8) in practice is sometimes aided by the use of barrier functions. The idea is to remove the constraints of Eq.(8), and augment the objective Eq.(7) with a barrier term that becomes large as the differences $$M(f_{c,k}+f, a_i, l, c) - M_{ik}^{lo}$$

$$GD(f, a_i, l, c) - GD_i^{lo}(f)$$

$$GD_i^{up}(f) - GD(f, a_i, l, c)$$

approach zero. The details of the barrier method are described in the textbook by P. Papalambros and D. Wilde, *Principles of Optimal Design Modeling and Computation*, Cambridge University Press, 2000.

Figure 9:
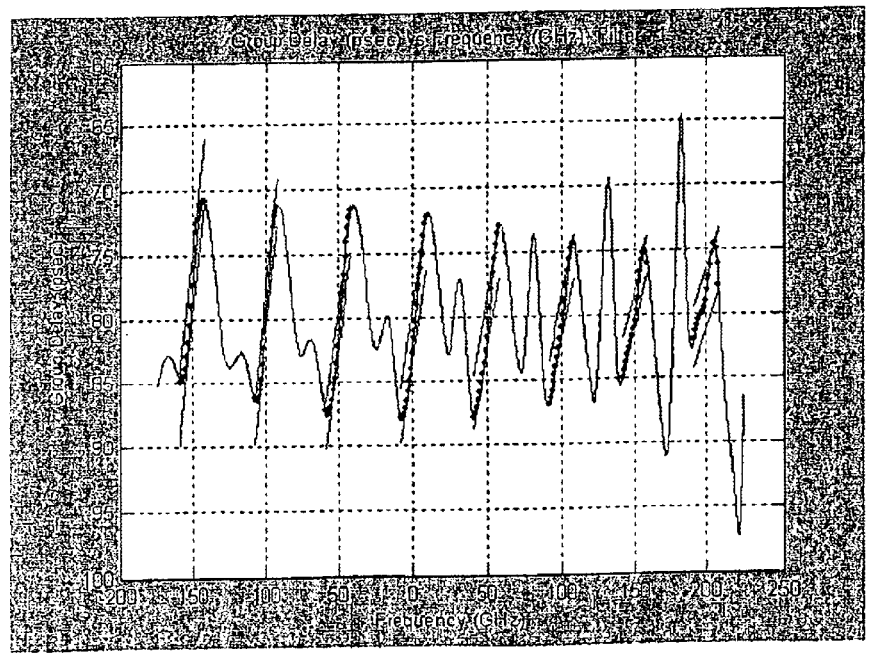
FIG. 9 is a plot of group delay versus frequency for eight WDM channels for a filter response of a generalized tunable filter according to the present invention.
Figure 10:
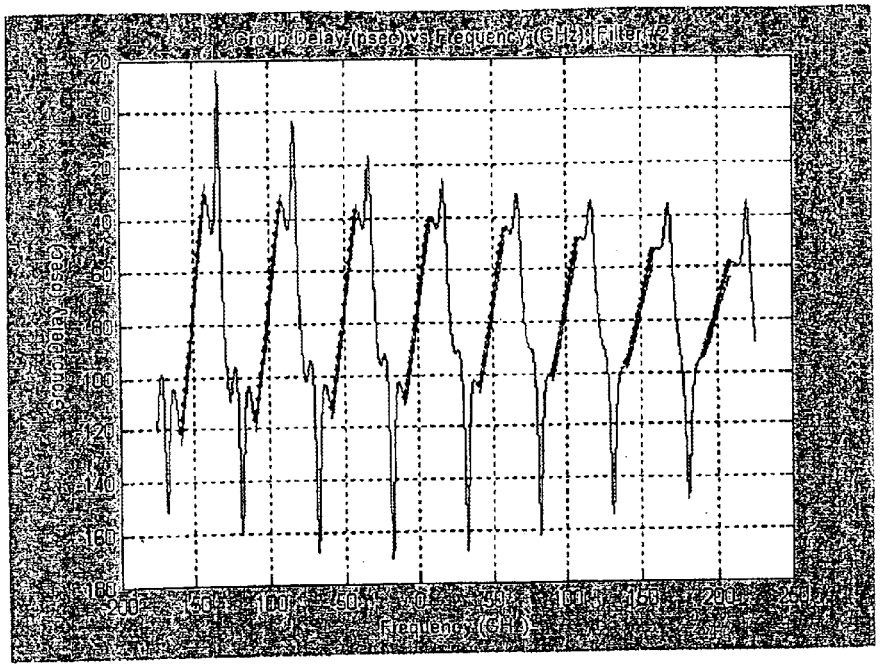
FIG. 10 is a plot of group delay versus frequency for the same eight WDM channels for a second filter response of the FIG. 7 generalized tunable filter.
Figure 11:
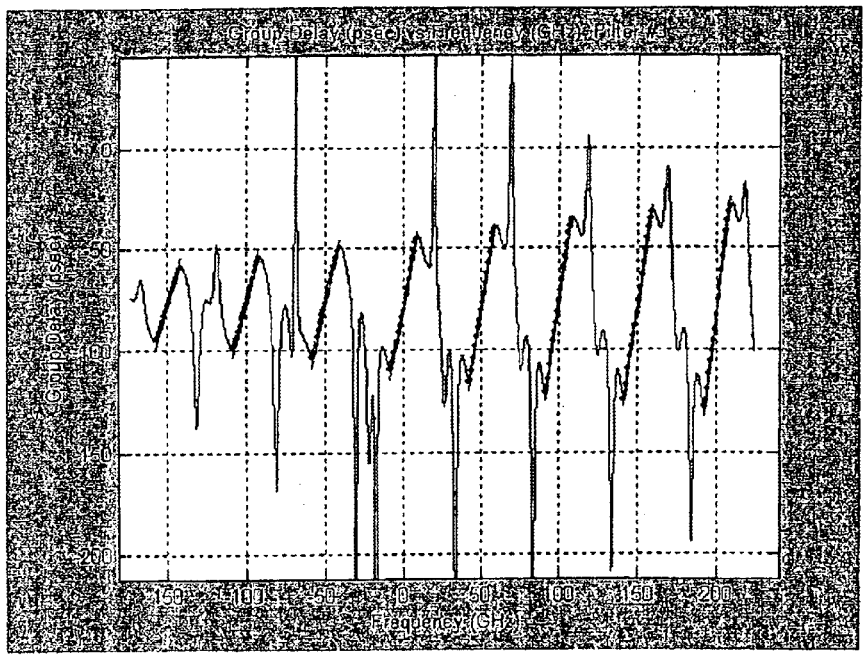
FIG. 11 is a plot of group delay versus frequency for the same eight WDM channels for a third filter response of the FIG. 7 generalized tunable filter in which the dispersion slope has been reversed from that of FIG. 8.

By using the minimum/maximum criterion of Eq. (8), multiple channels are simultaneously compensated. These channels are illustrated in FIG. 9. In this case, eight channels, each spaced 50 GHz apart, are designed to have a different dispersion. The zero frequency point on the horizontal axis corresponds to 194 THz. The filter is designed to be tunable to three separate frequency responses. The group delay responses i=1, 2, 3 are shown in FIGS. 9, 10, 11 respectively. Each of the three responses is designed to have a different dispersion slope. The dispersion slope is the change in the dispersion from channel to channel. A filter with tunable dispersion slope is very useful because different types of fiber typically have different dispersion slopes. As the routing of a signal in an optical network changes, the fiber type of the signal path changes, and so the dispersion slope changes as well.

To create a filter with tunable dispersion slope using existing methods, it is required to build a filter with a very large free spectral range, large enough to span then entire band of wavelengths to be processed. In this case, the filter order is expanded to that needed to get an arbitrary response over the entire band consisting of many wavelengths, from that needed to get an arbitrary response over one wavelength. The number of stages is approximately 50–100× using current methods, making them impractical.

The dispersion of filter i=1 is designed to be 100 ps/nm at channel 40, or 12 km of standard single mode fiber. To make the dispersion slope apparent for plotting purposes, the dispersion slope of this filter is exaggerated 100× over the actual dispersion slope of standard single mode fiber. The group delay response of filter i=2 is plotted in FIG. 10. The dispersion at channel 40 is designed to be 500 ps/nm, or 31 km of standard single mode fiber. As with FIG. 9, the dispersion slope is exaggerated by a factor of 100× for plotting purposes. The group delay response of filter i=3 is plotted in FIG. 11. The dispersion at channel 40 is also designed to be 500 ps/nm. However, the dispersion slope is designed to be opposite that of the previous FIGURE. The slope decreases from channel to channel in FIG. 10, while it increases from channel to channel in FIG. 11!! This capability of tunable dispersion slope is completely novel.

The values of $\alpha_{ik}$ for filters i=1, 2, 3 and channels k=1, . . . 8 are given in Table A below. The units are psec/GHz.

TABLE A

|  | Filter 1 | Filter 2 | Filter 3 |
| --- | --- | --- | --- |
| ITU Channel 37 | 1.1171 | 5.5853 | 2.3803 |
| ITU Channel 38 | 1.0102 | 5.0511 | 2.9144 |
| ITU Channel 39 | 0.9034 | 4.5170 | 3.4486 |
| ITU Channel 40 | 0.7966 | 3.9828 | 3.9828 |
| ITU Channel 41 | 0.6897 | 3.4486 | 4.5170 |
| ITU Channel 42 | 0.5829 | 2.9144 | 5.0511 |
| ITU Channel 43 | 0.4761 | 2.3803 | 5.5853 |
| ITU Channel 44 | 0.3692 | 1.8461 | 6.1195 |

The values of $\Delta l_{mz}$ (entries of l), θ (entries of c) and φ (values, or settings, of actuation vector a) are shown in the Table B below.

TABLE B

| Stage # | θ (degrees) | φ, filter i = 1 (degrees) | φ, filter i = 2 (degrees) | φ, filter i = 3 (degrees) | Δl (mm) |
|---|---|---|---|---|---|
| 0 | 277.0881 | 303.5310 | −256.0494 | 88.5189 | 4.0753 |
| 1 | 113.8439 | 150.7576 | 325.9258 | −4.3218 | −0.0260 |
| 2 | 244.6483 | 85.8192 | 55.4402 | −43.8118 | 4.1565 |
| 3 | −19.8063 | −89.0849 | −278.6536 | −409.8124 | 4.2312 |
| 4 | 33.1862 | 151.5829 | −93.5474 | −286.6616 | −0.1317 |
| 5 | 143.1763 | −51.4048 | −245.6231 | −218.2954 | 4.0090 |
| 6 | 229.9967 | −355.3099 | 237.0795 | −166.2567 | 4.2124 |
| 7 | 146.8159 | −292.6832 | −112.9524 | 80.8915 | 0.1203 |
| 8 | 393.8543 | 431.9404 | 37.7793 | −143.1334 | 3.9284 |
| 9 | 180.8802 | −287.2826 | −41.1481 | 277.7831 | 4.1350 |
| 10 | 294.7984 | 2.8586 | −99.9552 | 147.0662 | 0.0921 |
| 11 | 24.6873 | −143.2805 | 124.0540 | 266.5871 | 4.0365 |
| 12 | 226.5060 | −130.1347 | 112.6339 | 80.2004 | 4.0754 |
| 13 | 230.9677 | | | | |

Commercial software packages exist for solving the problem of Eqs. (7) and (8). For example, the Mathworks, Inc. of Natick, Mass., sells an optimization toolbox which can solve for the optimal design variables of such a nonlinear minimum/maximum problem. A list of other similar software packages is provided on page 355 of the textbook by P. Papalambros and D. Wilde. To use the software, the user simply supplies the objective and constraints as functions that can be evaluated as subroutines. In addition, a starting point of variables $\{a_1 \ldots a_{Nr}, l, c\}$ must be supplied. Methods of selecting the starting point are described immediately below. The output is the optimized set of variables $\{a_1 \ldots a_{Nr}, l, c\}$. Alternatively Eqs. (7) and (8) can be solved by other methods, such as sequential linear or sequential quadratic programming, as described in the Papalambros textbook.

There are two ways to determine a starting point (i.e., a value of $\{a_1 \ldots a_{Nr}, l, c\}$) for the optimization procedure defined above. The first is to perform a random search. A value of $\{a_1 \ldots a_{Nr}, l, c\}$ is drawn from a random distribution. In the preferred embodiment, the values of $a_1$ are phases, and may be initially chosen from a uniform distribution $[0,2\pi]$. For dispersion compensation applications, multiple wavelengths each requiring compensation, are spaced $f_s$ Hz apart. In this case, the initial values of l may be advantageously chosen so that the resulting delay is a small random integer multiple of $1/f_s$. With these random values, the filter is optimized over $\{a_1 \ldots a_{Nr}, l, c\}$ until an extremum is found. If the extremum of the optimization meets the required criteria, the procedure stops. If not, a new random point is selected, and this new point optimized. This process continues repeatedly until a sufficiently well-performing extremum of the optimization is reached, or until a maximum number of iterations is exceeded. There are many variations on this technique, which can shorten the search, such as branch and bound algorithms, genetic algorithms, and others familiar to those skilled in the art of optimization. An overview of these variations is described in the Papalambros and Wilde textbook.

The second way of determining a starting point is to use values for variables for which the corresponding filter response is known and close to the desired filter response(s). This approach is particularly useful for dispersion compensation applications, where the desired frequency response is periodic, or nearly periodic. Applications where the dispersion slope, or gain slope/profile, is specified, are an example. A good starting point for such a problem is a periodic filter. The desired response is close to periodic and therefore, the design variables for a periodic filter should be close to the variables for the optimized filter.

A periodic filter may be designed as follows. First, an FIR filter with the desired periodic response is designed, according to many methods described in the prior art, such as a textbook by A. Oppenheim and R. Schafer, *Discrete-Time Signal Processing*, Prentice Hall Signal Processing Series, 1989. The result is a set of FIR coefficients, $h_1, \ldots h_N$. Next, the FIR coefficients are converted to the previously described actuation vector a. The Jinguji and Kawachi paper mentioned above describes a way of converting an arbitrary FIR filter to a lattice type filter. This is the same as the arrangement shown in FIG. 4, except that the couplers are tunable. That is, the FIR coefficients define a set of lattice θ and φ, which are the elements of the actuation vector a. Since all (differential) waveguide lengths Δl are equal, the frequency response is therefore periodic. This periodic filter provides a useful starting point to optimization problems in which the desired filter frequency response is close to periodic for the generalized tunable filter of the present invention.

It is very important to optimize over arbitrary l. We find that if the elements of l are constrained to be all equal, or constrained to be small multiples of a fundamental length, it is impossible to perform adequate tunable dispersion, dispersion slope, or gain compensation, or combinations thereof. If the lengths are all equal, the response would be periodic exactly, which prohibits these combined functions.

Figure 12:
FIG. 12 is a representation of a add/drop multiplexer with some of its properties.

The present invention also provides for other filter devices, besides chromatic dispersion compensators. WDM add/drop multiplexers, as represented in FIG. 12, can be designed, for example. The method described above can be used, except that the constraint values of $M_i^{lo}(f)$, $M_i^{up}(f)$, $GD_i^{up}(f)$, and $GD_i^{up}(f)$ are different. Such a filter may again use the lattice Mach-Zehnder structure arrangement illustrated in FIG. 4. Such an arrangement has the convenient property that if the through magnitude response (say, $H_{11}$) is bandstop, then the cross response (in this case, $H_{12}$) will be bandpass. This is true because of the unitarity property $|H_{12}|^2=1-|H_{11}|^2$. A similar property holds on $H_{21}$ and $H_{22}$. FIG. 12 illustrates this phenomenon. This is ideal for an add/drop multiplexer. Suppose a wavelength is presented on input port one, $\lambda_k$ is dropped on output port two. Then because of the above unitarity, a wavelength $\lambda_k'$ presented on the same frequency on input port two is added and appears on output port one.

Because of the unitarity, specification of the cross or through magnitude response automatically specifies the complementary magnitude response. The form of the specification on $H_{11}$ is the same as Eq. (4), repeated here for clarity:

$$M(f,a_i,l) < M_i^{up}(f), \text{ (for frequencies to drop)}$$

$$M_i^{lo}(f) < M(f,a_i,l,c), \text{ (for frequencies to pass through)}$$

for $i=1, \ldots N_r$. In addition, group delay specifications are needed to avoid introducing unwanted dispersion:

$$GD_i^{lo}(f) < GD(f,a_i,l,c) < GD_i^{up}(f), \text{ (for pass through frequencies)}.$$

It is necessary to include an extra variable which represents the bulk group delay for each passed wavelength, in the same manner as that previously described for the dispersion compensation filter:

$$GD_i^{lo}(f_{c,k}+f) = t_{lo,ik} + \alpha_{ik}f$$

$$GD_i^{up}(f_{c,k}+f) = t_{up,ik} + \alpha_{ik}f \text{ for } i=1, \ldots N_r \text{ and } k=1, \ldots N_c$$

except that now α=0, because no dispersion compensation is being performed. The optimization takes the same form as Eqs. (7) and (8), except that while the magnitude lower bounds are provided in the passband, additional magnitude upper bounds are provided in the stopband. That is:

$$\min_{\{a_1 \ldots a_{Nr}, 1, c, t_{lo,11}, t_{lo,12}, \ldots, t_{lo,Nf,Nc}, t_{up,12}, \ldots, t_{up,Nr,Nc}, M_{11}^{lo}, \ldots, M_{Nr,Nc}^{lo}\}} \quad \text{Eq. (9)}$$

$$\left( \max_{ik} [\max(w \Delta M_{ik}^{lo}, \Delta t_{ik})] \right)$$

such that in the passband frequencies $$M_{ik}^{lo} < M(f_{c,k}+f, a_i, l, c)$$

$$GD_i^{lo}(f) < GD(f, a_i, l, c) < GD_i^{up}(f) \quad \text{Eq. (10)}$$

and such that in the stopband frequencies $$M(f_{c,k}+f, a_i, l) < M_{ik}^{up}$$

where w is the relative weighting of the magnitude and group delay ripple, and where $$\Delta t_{ik} = t_{up,ik} - t_{lo,ik}$$

$$\Delta M_{ik} = 1 - M_{ik}^{lo}$$

$$GD_i^{lo}(f_{c,k}+f) = t_{lo,ik}$$

$$GD_i^{up}(f_{c,k}+f) = t_{up,ik} \text{ for } i=1, \ldots N_r \text{ and } k=1, \ldots N_c \quad \text{Eq. (11)}$$

The quantities $M_{ik}^{lo}$, $GD_i^{up}$, and $GD_i^{lo}$ are allowed to change because they are design variables, but $M_{ik}^{up}$ is not allowed to change. This type of fixed inequality is easily incorporated into the previously described commercial software available for optimization solving.

It is even possible to design filters that perform simultaneous add/drop multiplexing and dispersion compensation. To do this, the above method is used, except that ox is reintroduced and is set to the desired group delay dispersion compensation. The group delay portion of Eq. (11) are then $$GD_i^{lo}(f_{c,k}+f) = t_{lo,ik} + \alpha_{ik} f$$

$$GD_i^{up}(f_{c,k}+f) = t_{up,ik} + \alpha_{ik} f \text{ for } i=1, \ldots N_r \text{ and } k=1, \ldots N_c$$

These filter functions are enabled by the joint optimization of $\{a_1 \ldots a_{Nr}, 1, c\}$. Previous filters have required more processing elements than the number required by the present invention.

It should be noted that modifications to the optimization objective can be made to make the resulting design less sensitive to errors in the design variables, which may be due to manufacturing tolerances, in the case of waveguide length vector l, the coupling angle vector c, or actuation errors, in the case of the actuation vector $\{a_1 \ldots a_{Nr}\}$. Techniques are available for characterizing the sensitivity, such as including a term in the objective which is proportional to the norm of the gradient with respect to the design variables. The Papalambros and Wilde textbook describe many of these techniques for reducing error sensitivity.

Therefore, while the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A generalized tunable optical filter comprising
   at least one input waveguide;
   at least one output waveguide;
   at least three processing elements interconnected between said at least one input waveguide and said at least one output waveguide, each of said processing elements characterized by a parametric length $\Delta l_k = n_k \Delta l_f$ where $n_k$ is an integer greater than 30 and $\Delta l_f$ is the longest fractional length common to all of said processing elements; and
   a plurality of actuators tuning phases of light signals passing through said processing elements.

2. The generalized tunable optical filter of claim 1 further comprising a control unit connected to each of said tunable actuators.

3. The generalized tunable optical filter of claim 2 wherein said control unit comprises a memory storing a plurality of actuator settings, each setting corresponding to a predetermined filter response.

4. The generalized tunable optical filter of claim 3 wherein control unit tunes said optical filter setting said plurality of actuators to one of said plurality of actuator settings.

5. The generalized tunable optical filter of claim 3 wherein said predetermined filter response compensates for chromatic dispersion for a plurality of ITU channels over an optical fiber.

6. The generalized tunable optical filter of claim 3 further comprising a second input waveguide and a second output waveguide, said at least three processing elements interconnected between said second input waveguide and said second output waveguide, and wherein said predetermined filter response diverts at least one WDM channel on said one input waveguide to said second output waveguide and diverts said at least one WDM channel on said second input waveguide to said one output waveguide so that said optical filter operates as an add/drop multiplexer.

7. The generalized tunable optical filter of claim 1 wherein one of said at least three processing elements comprises an unequal arm Mach-Zehnder interferometric device wherein said parametric length of said device comprises a differential length.

8. The generalized tunable optical filter of claim 1 wherein one of said at least three processing elements comprises a ring resonator interferometric device so that said parametric length of said device comprises a circumferential length.

9. The generalized tunable optical filter of claim 1 wherein each of said at least three processing elements has one of said plurality of actuators.

10. The generalized tunable optical filter of claim 9 wherein said at least three processing elements are interconnected to said at least one input waveguide and said at least one output waveguide by a plurality of fixed couplers.

11. The generalized tunable optical filter of claim 10 wherein said at least three processing elements are connected in a cascaded serial connection.

12. The generalized tunable optical filter of claim 11 wherein each of said at least three processing elements comprise an unequal arm Mach-Zehnder interferometric device.

13. The generalized tunable optical filter of claim 1 wherein at least one of said at least three processing elements has a parametric length such that $n_k > 100$.

14. A generalized tunable optical filter comprising
    at least one input waveguide;

at least one output waveguide;

at least three unequal arm Mach-Zehnder interferometer devices in a cascaded serial connection between said at least one input waveguide and said at least one output waveguide, each of said at least three unequal arm Mach-Zehnder interferometer devices characterized by a parametric length $\Delta l_k = n_k \Delta l_f$ where $n_k$ is an integer greater than 30 and $\Delta l_f$ is the longest fractional length common to all of said at least three unequal arm Mach-Zehnder interferometer devices; and a plurality of actuators responsively tuning phases of light signals passing through said at least three unequal arm Mach-Zehnder interferometer devices so that a selected setting of said plurality of actuators corresponds to a selected filter response.

15. The generalized tunable optical filter of claim 14 wherein said predetermined filter response compensates for chromatic dispersion for a plurality of ITU channels over an optical fiber.

16. The generalized tunable optical filter of claim 15 wherein said predetermined filter response comprises a positive dispersion slope for a first channel of said plurality of ITU channels and a negative dispersion slope for a second channel of said plurality of ITU channels.

17. The generalized tunable optical filter of claim 14 wherein at least one of said at least three unequal arm Mach-Zehnder interferometer devices has a parametric length such that $n_k > 100$.

18. The generalized tunable optical filter of claim 14 comprising seven unequal arm Mach-Zehnder interferometer devices in a cascaded serial connection between said at least one input waveguide and said at least one output waveguide.

19. A method of designing a generalized tunable optical filter having at least one input waveguide, at least one output waveguide, at least three processing elements interconnected between said at least one input waveguide and said at least one output waveguide by a plurality of fixed couplers, each coupler having a phase variable θ, each of said processing elements characterized by a parametric length variable $\Delta l_k$, and an plurality of actuators tuning phase variables φ for light signals at frequency f passing through said processing elements, said phase variables θ's, parametric length variables $\Delta l_k$'s, actuator phase variables φ's defining a filter response for light signals at frequency f, said method comprising selecting starting values for said variables;

determining an optimized objective predetermined property of a desired filter response corresponding to said variables; and computationally varying independently said variables from said starting values to find values of said variables corresponding to said desired filter response.

20. The method of claim 19 wherein each of said at least three processing elements comprises a device selected from the group comprising an unequal arm Mach-Zehnder interferometer device and ring resonator device.

21. The method of claim 19 further comprising defining constraints on at least one property of said filter response.

22. The method of claim 21 wherein said defining constraints step comprises planing a lower and upper bound of group delay for each of said plurality of ITU channels.

23. The method of claim 22 wherein said defining constraints step comprises placing a lower bound on magnitude gain for each of said plurality of ITU channels.

24. The method of claim 23 wherein said defining constraints step comprises placing a upper bound on magnitude gain for each of said plurality of ITU channels.

25. The method of claim 24 further comprising finding values of said variables corresponding to a plurality of said desired filter responses for chromatic dispersion compensation for said plurality of ITU channels.

26. The method of claim 19 wherein said optimized objective predetermined property in said determining step comprises a minimum of a maximum of magnitude ripple and group delay ripples for a plurality of ITU channels.

27. The method of claim 26 wherein said defining constraints step comprises placing an upper bound on magnitude gain for one of said plurality of ITU channels to block and an upper bound on magnitude gain for at least one of plurality of ITU channels to pass for a desired filter response of an add/drop multiplexer for said ITU channels.

28. The method of claim 19 wherein in said selecting starting values step said values are selected randomly.

29. The method of claim 19 wherein in said selecting starting values step said values are selected as values for which a corresponding filter response is known and close to the desired filter response(s).

30. The method of claim 29 wherein said values are selected for a corresponding filter response of an FIR filter.

31. The method of claim 19 wherein said optimized objective predetermined property in said determining step comprises a minimum of a maximum of group delay ripples for a plurality of ITU channels.

\* \* \* \* \*